United States Patent [19]
Jones

[11] 3,807,768
[45] Apr. 30, 1974

[54] TRAILER HITCH
[76] Inventor: William R. Jones, 5705 Clinton Blvd., Jackson, Miss. 39209
[22] Filed: Oct. 18, 1972
[21] Appl. No.: 298,771

[52] U.S. Cl. .......................................... 280/478 B
[51] Int. Cl. ............................................ B60d 1/16
[58] Field of Search .................. 280/478 B, 478 A

[56] References Cited
UNITED STATES PATENTS
3,279,819  10/1966  Edmonds ...................... 280/478 B
2,973,971   3/1961  Oddson ......................... 280/478 B
3,140,881   7/1964  Antici ........................... 280/478 A
3,612,576  10/1971  Marler .......................... 280/478 B
3,361,446   1/1968  Jeffes ........................... 280/478 B Primary Examiner—Leo Friaglia

[57] ABSTRACT

A trailer hitch having a housing attachable to either a towing vehicle or to the tongue of a trailer and a tongue attachable to either the vehicle or trailer tongue and insertable by a longitudinal movement into said housing with both an up and down as well as a side-to-side movement to simplify coupling the trailer to the vehicle and a pin for coupling the tongue in the housing.

5 Claims, 4 Drawing Figures

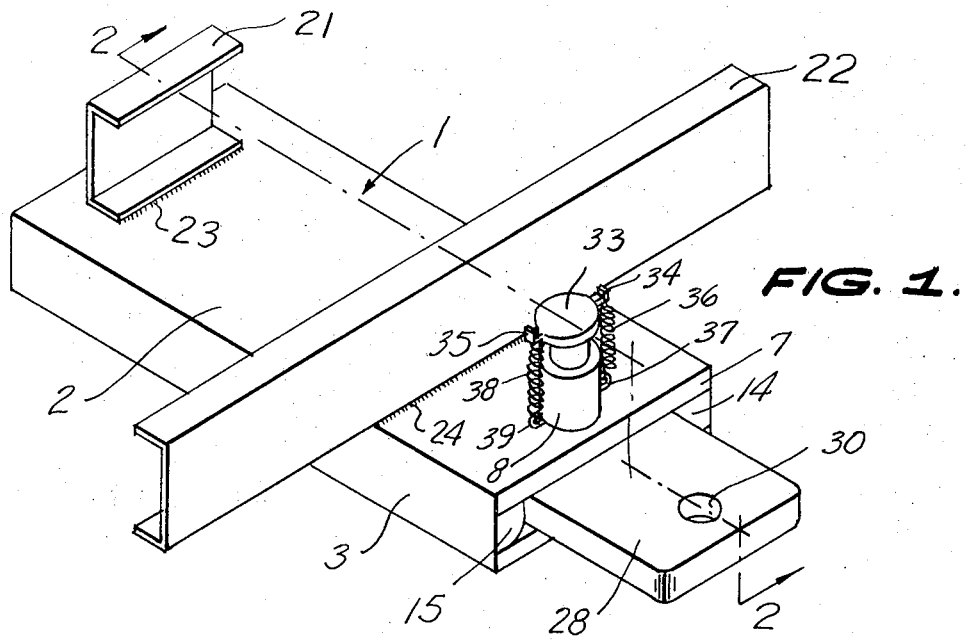
FIG. 1.
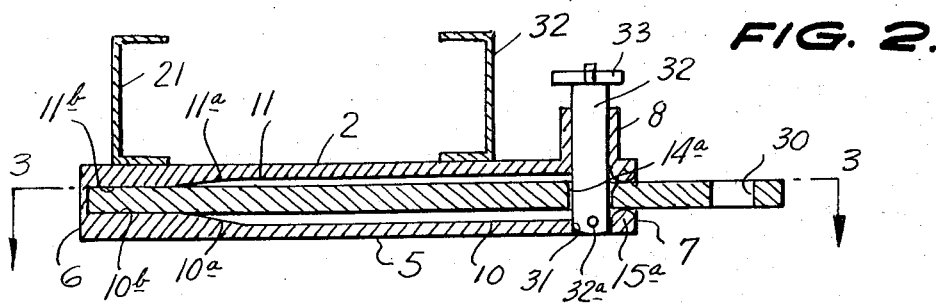
FIG. 2.
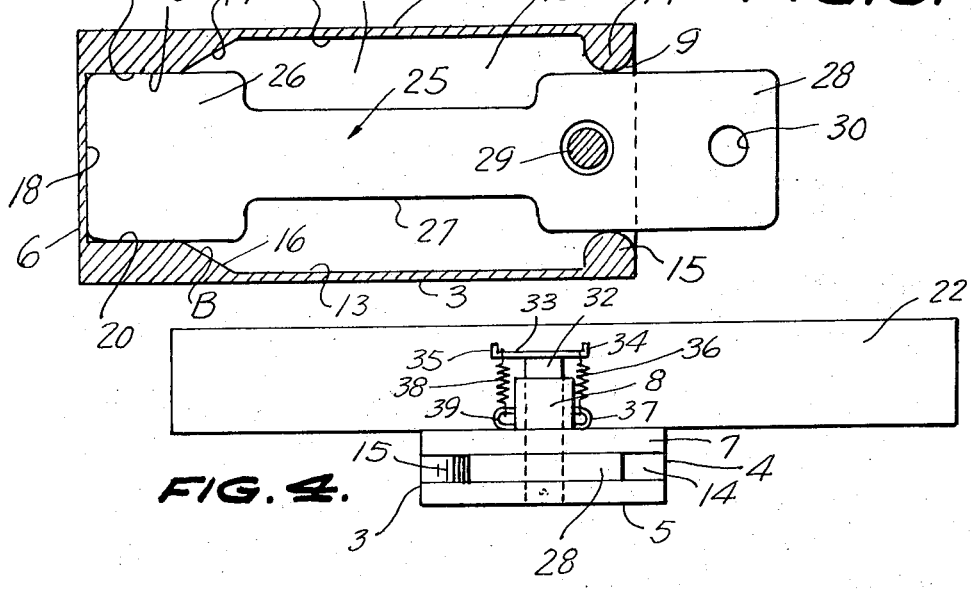
FIG. 3.
FIG. 4.

TRAILER HITCH

The present invention is concerned with an improvement in trailer hitches.

The principal object of the invention is to provide a trailer hitch with a tongue insertable in and coupled to a housing either of which can be attached to a towing vehicle and a trailer, capable of pulling a relatively heavy trailer and which tongue can be inserted in the housing with both an up and down as well as a side-to-side movement whereby the trailer can be attached to the vehicle when the ground supporting the same is not level, when a trailer jack is not available or when circumstances preclude jacking the trailer.

A further important object of the present invention is to provide a trailer hitch having a housing connectable to a towing vehicle and a tongue attachable to a trailer, insertable in said housing and which housing will take the force of the tongue when the vehicle should stop suddenly and the trailer forces said tongue inwardly of said housing even when a heavy trailer is being towed.

Still further objects of the invention will be set forth and obvious from the following description of the accompanying drawings, in which, FIG. 1 is a perspective view of the present trailer hitch, FIG. 2 is a longitudinal sectional view taken on line 2—2 of FIG. 1, FIG. 3 is a sectional view taken on line 3—3 of FIG. 2, and, FIG. 4 is an end view taken from the right of the proceeding figures.

Referring now more particularly to the drawing in which like and corresponding elements have the same reference characters, 1 generally indicates the housing having top 2, sides 3 and 4, bottom 5, closed rear end 6 and open front end 7.

A tube 8 is attached to the front end portion of top 2 and opens into the interior of said housing.

End 7 has an open mouth 9 defined by semi-circular ledges 14, 15, 14a and 15a. The interior of said housing has a flat bottom wall 10 which slants inwardly at 10a to flat end portion 10b. The interior flat top wall 11 slants inwardly at 11a to flat end portion 11b. Interior flat side wall 12 slants inwardly at 17 to flat end portion 19 and the opposite interior flat side wall 13 slants inwardly at 16 to flat end portion 20. The bottom wall 10, top wall 11 and side walls 12 and 13 define a chamber medial portion A having a substantially rectangular cross-section. Slanting portions 10a, 11a, 16 and 17 form a funnel B while end portions 10b, 11b, 19 and 20 with lateral interior end wall 18 form a recess C of a smaller rectangular cross-section than medial portion A.

Vehicle cross-members 21 and 22 are attached, as by welding, to top 2 at 23 and 24, respectively. Crossmember 22 could, for example, be a bumper of the vehicle.

A hitch tongue 25 has an inner end portion 26 shaped to mate with recess C and is larger than mouth 9, narrow extended medial portion 27 and an outer end portion 28 shaped to freely extend in mouth 9, but close off the interior of housing 1 to keep out dust and foreign matter to prevent fouling of the mechanism. Outer end portion 28 has a countersunk opening 29 positioned to align with the bore of tube 8 when tongue 25 is inserted in the housing and a second opening 30 of a size for the insertion of a pin or a standard trailer ball, lock washer and nut (not shown). Housing 1 also has an opening 31 from wall 10 to bottom 5 and aligned with the bore of tube 8.

A pin 32 is capable of mating with the bore of tube 8 and holes 29 and 31 and has a laterally extending top 33 with upstanding lugs 34 and 35 on opposite sides thereof. Springs 36 and 38 are connected to lugs 34 and 35, respectively, and also to eyes 37 and 39, respectively, attached to the bottom portion of tube 18 tending to move pin 32 inwardly. Pin 32 also has bottom opening 32a for receiving a locking member (not shown).

In the use of the trailer hitch housing 1 is attached to lateral members, indicated at 21 and 22 of the towing vehicle by any conventional means such as welding, so as to extend rearwardly of the vehicle. Tongue 25 is attached by the conventional trailer ball, lock washer and nut to the trailer.

Pin 32 is raised and tongue end 26 is inserted through mouth 9 using an up and down and/or side-by-side movement of said tongue as is sometimes necessary as when the vehicle and trailer are not on level ground, a trailer jack is not available or when circumstances preclude jacking the trailer. As soon as tongue end portion 26 reaches funnel C it is guided into recess C until adjacent end wall 18. At this time pin 32 will pass through opening 29 into and beyond opening 31 whereupon a cotter pin or lock (not shown) can be inserted through hole 32a.

End 28 of tongue 25 is smaller than mouth 9 to allow considerable play therebetween during the insertion, but end 26 is wider than mouth 9 to prevent the complete withdrawal of tongue 25 from housing 7. End wall 18 will stop the further insertion of tongue 25 even when the vehicle stops suddenly and a heavy trailer attached to said tongue lerches forward.

Tongue 25 can of course be slid longitudinally of housing 1 by raising pin 32 and sliding said tongue when desired.

It is to be appreciated that housing 1 can be attached to the trailer and tongue 25 attached by the standard trailer ball connection to the vehicle.

As an example of the trailer hitch, housing 1 could be 13½ inches long, 1¾ inches high and 6 inches wide with a 4 inches wide by ¾ inch high mouth 9, medial chamber A being 8 5/16 inches long, 5⅝ inches wide and 1 inch high, recess C being 4½ inches wide, 27/16 inches long and ⅝ of an inch high while funnel B is 1 15/16 inches long. Tongue 25 could be 17 inches long and ⅝ of an inch high along its length and end portion 26 4 inches wide by 3⅞ inches long, medial portion 27 being 2 inches wide and 7¾ inches long and outer end portion 28 3⅞ inches wide by 5⅝ inches long. Tube 8 could be 1¼ inch high with a bore of 1 inch diameter and pin 32 could be 3⅝ inches high with 15/16 inch diameter.

Preferably housing 1 and tongue 25 would be of 36 steel plate, pin 32 of M 1020 steel bar and tube 8 of standard steel pipe.

I claim:

1. A trailer hitch comprising a hollow housing having an open front end, a tongue insertable in said housing through said open end, said housing having an interior chamber with a medial portion, an end recess smaller than said medial portion and a funnel shaped portion connecting said medial portion and recess, said funnel having inwardly slanting flat top, bottom and side walls each contiguous with corresponding walls of said chamber medial portion and recess, said tongue having an end portion capable of mating with said recess and an opposite end portion with a plurality of openings and a spring pressed pin slidably mounted through said housing at a position for passing through one of said tongue openings when in said housing.

2. A trailer hitch as claimed in claim 1 wherein said tongue end portion is larger in cross-section than said housing open front end and smaller than said chamber medial portion.

3. A trailer hitch as claimed in claim 1, wherein said housing is closed at its top, bottom, sides and rear end, said chamber extends longitudinally of said housing with said housing rear end providing the base of said chamber recess.

4. A trailer hitch as claimed in claim 1, wherein said chamber medial portion has flat top, bottom and side walls, said recess has corresponding flat top, bottom and side walls.

5. A trailer hitch as claimed in claim 1, wherein a tube is attached to said housing and has a bore opening in said housing chamber, said pin is slideably mounted in said tube and has lugs on an end of said pin exteriorly of said tube and resilient means connects said lugs to said tube tending to press said pin inwardly of said tube.

* * * * *